(12) United States Patent
Bartone et al.

(10) Patent No.: US 11,531,099 B2
(45) Date of Patent: Dec. 20, 2022

(54) SYSTEM AND METHOD FOR DETECTION AND REPORTING OF TARGETS WITH DATA LINKS

(71) Applicant: Ohio University, Athens, OH (US)

(72) Inventors: Chris G. Bartone, Athens, OH (US); Anthony Milluzzi, Westlake, OH (US)

(73) Assignee: Ohio University, Athens, OH (US)

( * ) Notice: Subject to any disclaimer, the term of this patent is extended or adjusted under 35 U.S.C. 154(b) by 422 days.

(21) Appl. No.: 16/479,953

(22) PCT Filed: Jan. 23, 2018

(86) PCT No.: PCT/US2018/014877
§ 371 (c)(1),
(2) Date: Jul. 23, 2019

(87) PCT Pub. No.: WO2018/136947
PCT Pub. Date: Jul. 26, 2018

(65) Prior Publication Data
US 2019/0383936 A1 Dec. 19, 2019

Related U.S. Application Data

(60) Provisional application No. 62/449,317, filed on Jan. 23, 2017.

(51) Int. Cl.
*G01S 13/91* (2006.01)
*G01S 7/00* (2006.01)
*G01S 13/86* (2006.01)
*G01S 7/41* (2006.01)

(52) U.S. Cl.
CPC ............ *G01S 13/913* (2013.01); *G01S 7/003* (2013.01); *G01S 13/86* (2013.01); *G01S 7/411* (2013.01); *G01S 7/414* (2013.01)

(58) Field of Classification Search
CPC ........ G01S 13/913; G01S 7/003; G01S 13/86; G01S 7/411; G01S 7/414; G01S 13/878; G01S 13/865; G01S 13/872
See application file for complete search history.

(56) References Cited

U.S. PATENT DOCUMENTS

| | | | |
|---|---|---|---|
| 7,710,310 B2 * | 5/2010 | Huizing | G01S 13/86 342/52 |
| 2007/0024494 A1 * | 2/2007 | Dizaji | G01S 7/415 342/195 |
| 2010/0231721 A1 * | 9/2010 | Meloche | G08G 5/065 348/159 |
| 2010/0292871 A1 * | 11/2010 | Schultz | G01S 13/865 342/29 |
| 2012/0032835 A1 * | 2/2012 | Mazzei | G01S 13/426 342/123 |
| 2013/0169468 A1 * | 7/2013 | Johnson | G01S 7/003 342/41 |

(Continued)

*Primary Examiner* — Erin F Heard
*Assistant Examiner* — Juliana Cross
(74) *Attorney, Agent, or Firm* — Standley Law Group LLP; Jeffrey S. Standley; Jeffrey C. Norris (57) ABSTRACT

Systems and methods for detection and reporting of small targets to an operational area. Exemplary embodiments are presented to detect targets such as avian species, UAS, UAV, and drones, and transmit unique small target identifier information via data link, such as ADS-B, to an operational area.

18 Claims, 3 Drawing Sheets

(56) References Cited

U.S. PATENT DOCUMENTS

2013/0342380 A1* 12/2013 Nohara .................. G01S 13/917
              342/90
2015/0077284 A1*  3/2015 Tidhar .................... G01S 13/86
              342/52
2016/0282131 A1*  9/2016 Palfreyman .......... G08G 5/0021
2016/0327645 A1* 11/2016 Nishimoto ............ B64C 39/024

* cited by examiner

SYSTEM AND METHOD FOR DETECTION AND REPORTING OF TARGETS WITH DATA LINKS

CROSS-REFERENCE TO RELATED APPLICATION

This application claims the priority benefit of U.S. Provisional Application No. 62/449,317, filed Jan. 23, 2017, which is hereby incorporated by reference in its entirety.

This invention was made with government support provided by the Federal Aviation Administration under Grant 16-G-012. The government may have certain rights in the invention.

BACKGROUND AND SUMMARY OF THE INVENTION

Exemplary embodiments of the present invention relate generally to systems and methods for the detection and reporting of targets.

In aviation, a bird strike involves the airborne collision of a bird and aircraft. Typically, very small birds (e.g., sparrow) produce little damage and risk to an airborne aircraft, while large birds (i.e., small targets such as a crow, duck, goose, flock of larger birds, etc.) produce greater potential for damage and risk to airborne aircraft. A recent well known case of a bird strike occurred to US Airways Flight 1549, which successfully landed on Hudson River with 155 passengers on-board. Roughly 10,000 strikes are reported annually, however estimates suggest that as few as half of total strikes are reported. Less than 8% of strikes occur above 3,000 feet, and 61% occur at less than 100 feet according to the FAA Wildlife Hazard Management Manual. The FAA estimates $400 million in damages annually are attributed to bird strikes in the United States alone and over $1.2 billion in damages occur annually worldwide.

The FAA has provided guidance on Wildlife Strike reports where the number and kind of strike (among other details) are required to be reported when known. These figures are public, and an estimated 39% of strikes at certificated airports from 2004-2008 were reported. However, report percentages have been increasing year-to-year (1990-2013). The FAA also has produced Airport Cooperative Research Program (ACRP) Reports to aid airports with wildlife hazard mitigation. In addition, the FAA has instituted various Wildlife Hazard Awareness campaigns to raise awareness of bird strikes with FAA posters and public wildlife strike information, including a bird strike database. The FAA has also issued various Advisory Circular guidelines for bird strike mitigation.

The FAA Advisory Circular guidelines for bird strike mitigation puts forward a Standard Avian Target (SAT), which is a theoretical target for the purpose of evaluating avian radar systems. One SAT is intended to represent the physical features of an average crow with mass of 1.1 lb (0.5 kg). This type of low radar cross section (RCS) target is also expected to be similar to the RCS of a small unmanned aircraft system (sUAS) (i.e., small unmanned aerial vehicle (UAV) or drone). As a result, the inventors believe exemplary embodiments of this architecture to detect and report low RCS avian targets may also be applied to low RCS sUAS/UAS targets that may operate in and around airport property (intentionally or unintentionally) and present a potential risk to airborne aircraft.

While various methods have been used to observe avian activity and report this activity to the air traffic control (ATC) tower, they lack automatic functions. Wildlife officials have visually inspected various regions of the airport property, and some experimental radar systems have been researched to detect and manually report avian activity to the ATC tower. These avian activities then may be manually reported using voice communications to pilots from radar operators at the ATC tower.

Exemplary embodiments of the present invention include systems and methods for detection of small targets with surveillance systems and reporting targets to an operational area. Embodiments of the system and methods may utilize specialized surveillance sensor detection systems and reporting methods for target distribution. Exemplary embodiments are presented to detect targets such as avian species, unmanned aerial systems (UAS), unmanned aerial vehicles (UAV), and drones, including flocks or swarms, and transmitting this information via data link to an operational area such as the National Airspace System (NAS). For instance, exemplary embodiments for avian radar target detections from an avian radar system may produce target reports that are suitable for distribution within the National Airspace System (NAS) to mitigate bird strike risk to airborne vehicles (e.g., aircraft, UAS, UAV, rotorcraft, etc.). For aviation applications, these detected target reports may be transmitted to the airport Air Traffic Control (ATC) tower and aircraft users within the operational range of the airport. Details for formatting the target detections and target reports using an Automatic Dependent Surveillance-Broadcast (ADS-B) message structure are illustrated that provide for unique small target identifiers that include unique Call Sign and Emitter Category. Although avian detections are illustrated in embodiments for this architecture and detection system, exemplary embodiments may also be applied to detect other small low radar cross section (RCS) targets (e.g., UAS, UAVs, etc.) that may operate in and around an operational environment such as an airport and present a potential risk to mobile vehicles. Exemplary embodiments may be employed in any operational environment where there is a target risk.

One exemplary embodiment of a surveillance and target reporting system may comprise any combination of the following features: a land-based surveillance detection system adapted to detect small targets; a data link interface configured to interface the surveillance detection system to a small target processor; a small target processor adapted to receive small target data from the surveillance detection system, the small target processor further adapted to utilize at least one type of secondary data to enhance reliability for enhanced target reporting that uses at least one small target identifier; a report formatter adapted to receive report data from the small target processor and format an enhanced target report using a predefined data link format; a transmission system adapted to receive and distribute the enhanced target report to an operational environment; a data reception system adapted to receive the enhanced target report using the predefined data link format; and a presentation device configured to receive the enhanced target report from the data reception system and present the enhanced target report.

In another exemplary embodiment, a method for surveillance and reporting may comprise any combination of the following features: providing a land-based surveillance detection system adapted to detect small targets; providing a data link interface that interfaces the surveillance detection system to a small target processor such that the small target processor receives small target data from the surveillance detection system; further providing at least one type of secondary data to the small target processor that the small target processor utilizes to enhance reliability for enhanced target reporting that uses at least one small target identifier; providing a report formatter that receives report data from the small target processor and formats an enhanced target report using a predefined data link format; providing a transmission system that receives and distributes the enhanced target report to an operational environment; providing a data reception system that receives the enhanced target report using the predefined data link format; and providing a presentation device that receives the enhanced target report from the data reception system and presents the enhanced target report.

In one exemplary embodiment, the surveillance detection system may comprise a radar system.

In one exemplary embodiment, the surveillance detection system may comprise or be used in association with at least one other sensor.

In one exemplary embodiment, the small target processor may utilize or be adapted to utilize a plurality of types of secondary data.

In one exemplary embodiment, the secondary data may be from a database system.

In one exemplary embodiment, the data link interface uses or may be configured to use an ASTERIX message format.

In one exemplary embodiment, the predefined data link format uses or may be configured to use ADS-B message format and at least one unique small target identifier.

In one exemplary embodiment, the transmission system uses or may be configured to use a wired Ethernet interface.

In one exemplary embodiment, the transmission system uses or may be configured to use a wireless communications link.

In one exemplary embodiment, the wireless communications link may be an ADS-B data link that uses or is configured to use at least one unique small target identifier.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
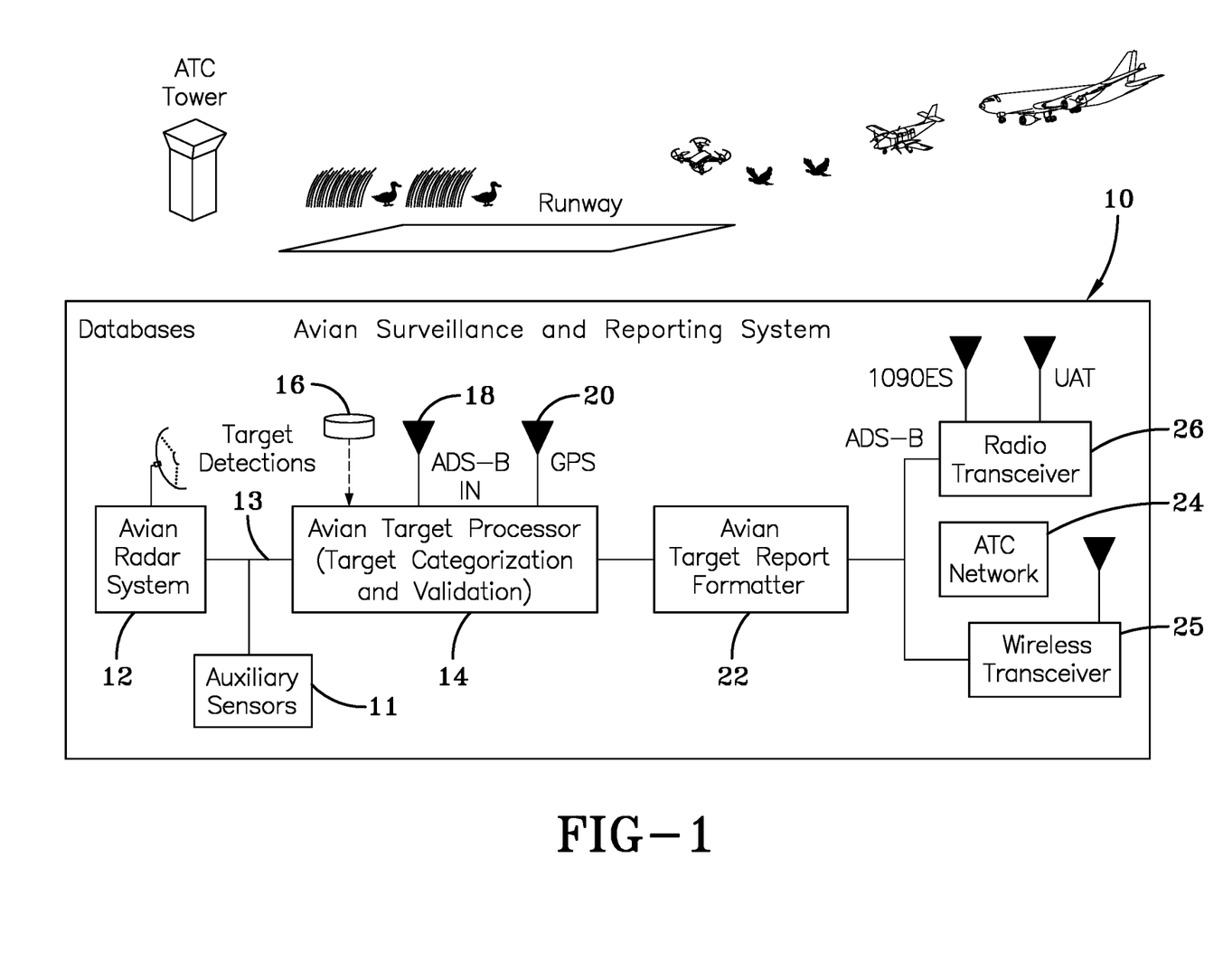
FIG. 1 is a schematic view of an exemplary embodiment of an avian surveillance detection and reporting system on airport property.

Exemplary embodiments of the present invention are directed to a target surveillance and processing system. FIG. 1 illustrates an exemplary embodiment of an avian surveillance and reporting system 10 to mitigate bird strike risk using a surveillance detection system 12 that is a radar system. This approach includes the use of "stand-alone" avian surveillance radar as the primary detection means. Several research radars have been investigated by the FAA and are in various stages of development and deployment. For example, these types of avian specific radars may be located on an airport or other property. These types of avian radars may be adapted to rapidly acquire and report small low RCS targets. While the surveillance detection system is a radar system for this embodiment, one skilled in the art would understand that other types of surveillance detection sensor systems may be used as primary or secondary (i.e., augmentations and/or fused) sensors, such as optical, thermal, and LIDAR (collectively, 11).

In this embodiment, the avian radar system may produce target detections and provide various performance parameters. The interface between the avian radar systems that produces target detections may use a generic data interface 13 so that various avian radar systems may be integrated to the overall avian surveillance and reporting system. One such data interface that may be implemented is the Eurocontrol All-Purpose Structured Eurocontrol Surveillance Information Exchange (ASTERIX). An exemplary embodiment may use, for example, special category (CAT) messages, such as CAT48 Transmission of Monoradar Target Reports, CAT34 Transmission of Monoradar Service Messages, CAT247 Version Number Exchange, CAT63 Sensor Status Messages, CAT21 ADS-B Target Reports type messages, and/or other suitable messages.

An exemplary embodiment of an avian surveillance and reporting system also includes an avian target processor 14 that receives various data to produce an avian target suitable for report generation. The avian target processor receives the target detections and performance parameters from the avian radar system. The avian target processor may interface with the generic data interface, e.g., ASTERIX data format. The avian target processor may also receive auxiliary sensor data for input sensors such as optical, thermal, or LIDAR to help fuse and provide enhanced target detections. Furthermore, the avian target processor may receive additional secondary data from an airport database 16 that may contain other information. In an exemplary embodiment, one database structure may provide details of the runway and taxiway orientations. In an exemplary embodiment, the system may use a database similar to that utilized within the Airport Surface Detection Equipment, Model X (ASDE-X) airport surveillance radar system. Second, an airport Geodetic Information System (GIS) database 16 may be included to obtain terrain, including low lying areas where ground avian activity may be heavy. The avian target processor may also use time of day to help weight the threat level of the enhanced target reports. The avian target processor 14 may also receive ADS-B IN 18. The ADS-B IN functionality may provide critical data on the location of various ADS-B equipped aircraft within the operational environment so that intelligent decisions may be made by the avian target processor 14 on "when to" and "when not to" provide a specific avian target detection for avian target reporting. The avian target processor 14 may also receive signals from a GPS receiver 20. One of ordinary skill in the art may recognize that other satellite navigation or position information may be used to fulfill this function (e.g., survey location, other Global Navigation Satellite Systems (e.g., Galileo, Glonass, and BeiDou). In an exemplary embodiment, the location of the avian target reports may be reconciled with the airport runways and the location of the aircraft in the area to filter and enhance the reliability and validity of the avian target reports. The avian target reports that are assessed to be of some potential risk to airborne aircraft may be passed to an avian target report formatter 22.

Figure 2:
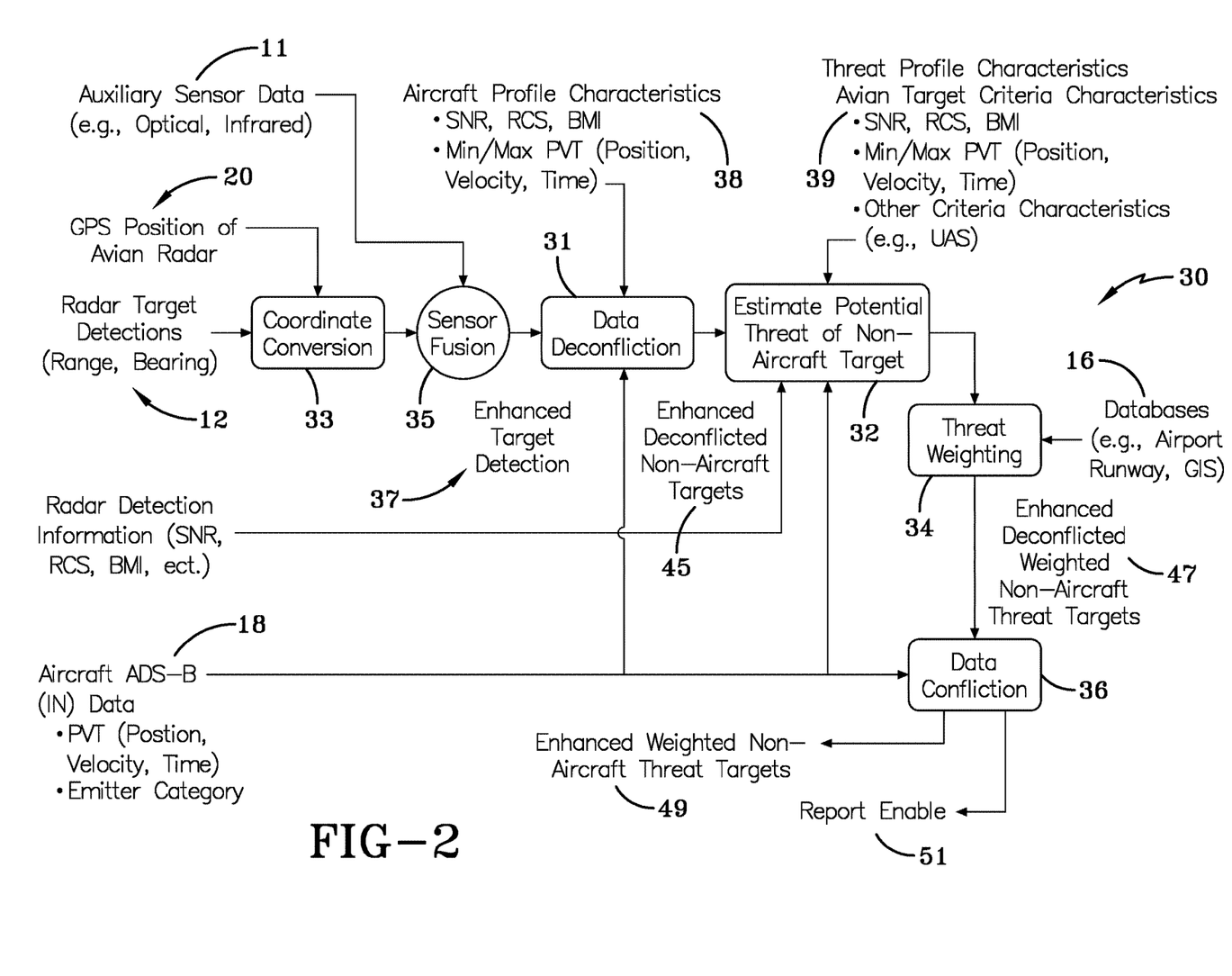
FIG. 2 is a flow diagram of an exemplary embodiment of an avian target process.

FIG. 2 illustrates an exemplary embodiment of a process 30 of an avian target processor 14. In this exemplary embodiment, radar target detection information from surveillance detection system 12 is introduced to the system. Target report data may be passed into a coordinate conversion block 33, which converts the radar detections to a standard coordinate frame by using the position from GPS receiver 20 of the avian radar. The target report data may then be processed through a sensor fusion block 35, which may take auxiliary sensor data 11 to augment the radar data. The enhanced target detections 37 may then be fed into a data detection block 31, which may receive Aircraft ADS-B (IN) data 18 and may also use aircraft profile characteristics 38 to remove aircraft detections from the enhanced target detections, leaving only enhanced deconflicted non-aircraft targets 45. An estimated potential threat of non-aircraft target block 32 may use the enhanced deconflicted non-aircraft targets 45, threat profile characteristics 39, and the ADS-B (IN) Data 18 to determine if a particular non-aircraft target falls under a known specifications limit of a defined threat level. The enhanced deconflicted non-aircraft threat targets 47 may then be passed to a threat weighting block 34 that may use databases 16 and may weigh the threat seriousness based on factors such as location of the threat relative to airport operations, known problem areas, and the time of the day. This block may then pass out enhanced deconflicted weighted non-aircraft threat targets to a data confliction block 36 that may correlate aircraft and non-aircraft targets to determine what constitutes enhanced weighted non-aircraft threat targets 49 that are worthy of being formatted for distribution as a formal report. The data confliction block 36 may also output a report enable 51 signal to be passed along to the avian target report formatter 22, which may enable the report to be formatted for transmission. In this exemplary embodiment, a separation distance vector or index may be used in the data deconfliction block 31 and the data confliction block 36 to determine which common targets appear in both the enhanced target detections 37 data and the ADS-B (IN) data 18, or for threat assessment purposes may be weighted by data such as position, velocity, time, update rate, signal quality, or target information. Additionally, in an exemplary embodiment, a separation distance vector or index may utilize distance as well as the velocity vectors closure rate and time in accordance with various thresholds to determine the status of one target in relation to another target or aircraft. Furthermore, one of ordinary skill in the art may recognize that other deconfliction and confliction routines may be used, e.g., ellipsoidal estimation, with the estimated position or velocity near the center, with error estimates with associated bounds in the long-trace and cross-track directions.

The avian target report formatter 22 may receive the avian targets that have been categorized and validated for transmission into the operational environment, such as the NAS. Referring to FIG. 1, the avian target report formatter may format this information into a message so that it may be transmitted to the operational environment via a transmitter and data link. The transmission means may be over a wired network 24 (e.g., to ATC tower), a wireless network 26, or a wireless transceiver that may have largely transmission functionally (i.e., broadcast) 25, such as used with the Automated Weather Operation Systems (AWOS), AWOS Data Acquisition Systems (ADAS), or Automated Terminal Information Systems (ATIS). The wired network 24 may be a network that supports interfaces such as Ethernet, Internet, or a dedicated communication link. A wireless network 26 may include an aviation type data link such as that supported by ADS-B (i.e., UAT or 1090ES). The wireless transceiver 25 such as WiFi or cellular may also be used to convey the formatted target reports to the operational environment. To illustrate a particular exemplary embodiment, an avian ADS-B message format for UAT is presented herein.

Target Report Formatter and Data Link Distribution

Figure 3:
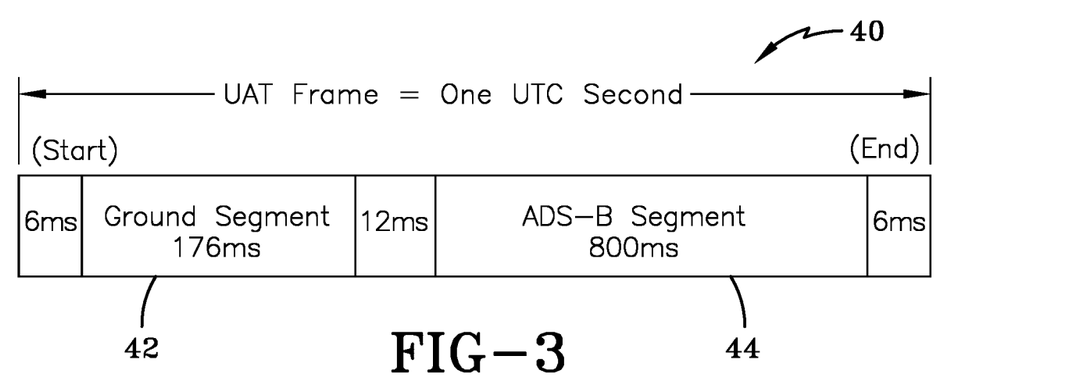
FIG. 3 is a schematic diagram of a UAT data frame illustrating an exemplary embodiment of an ADS-B segment to support avian target reports.

Because smaller general aviation (GA) type aircraft more often fly at lower altitude and are smaller, an exemplary embodiment of this system may provide value for target detections and reporting of avian and UAS type targets and message dissemination using the UAT data link. UAT is a multi-purpose data link for surveillance related applications by aircraft typically operating at less than 18,000 feet. (For other larger classes of airborne vehicles that typically fly at higher altitudes, the 1090ES data link may be more suitable using the capabilities of Mode S.) As shown in FIG. 3, the UAT data frame 40 is one UTC second in duration with Ground Segment 42 and ADS-B Segment 44 fields. In an exemplary embodiment, the Ground Segment 42 transmission consists of 32 ground broadcast slots at 5.5 ms in length, each containing 432 bytes of data. One alternative embodiment may allow the avian surveillance systems to occupy one of these 32 ground broadcast slots for each avian radar system deployed at a particular airport. This embodiment may be consistent with ground-based radar detecting non-ADS-B equipped aircraft and distributing their position to ADS-B equipped aircraft, where consideration may be given to the other surveillance ground-based radar operating within a given region to ensure compatibility.

In an exemplary embodiment, the later part of the one UTC second UAT data format is the ADS-B Segment field 44 where 145 messages, each 5.5 msec in duration, may be accommodated, which may be transmitted by aircraft reporting their position (and other) information. In an exemplary embodiment, this ADS-B Segment 44 part of the UAT Frame is where the design of avian messages may be supported. Thus, the ground based avian surveillance systems may act as a surrogate on behalf of the intruding avian target to report avian targets that present a potential risk to aircraft operating in and around the airport property.

While a UAT ADS-B Segment Message may be composed as a short or long message, examples of long messages to support avian message reporting are presented herein for purposes of illustration. For example, to compose a long avian UAT ADS-B message, the Header (HDR), State Vector (SV), Mode Status (MS), and Auxiliary State Vector (AUX SV) may be used. The HDR may be made up of a Payload Element, which may be encoded as a "1" (i.e., made up of the above long elements), and the Address Qualifier Field. The Address Qualifier may be encoded as "3" to indicate a Traffic Information System-Broadcast (TIS-B) target with a traffic file identifier.

The SV part of the long avian UAT ADS-B message may be encoded with the avian position, velocity, and heading information. The avian position, velocity, and heading information may be received from the avian radar systems and validated (and possibly converted) by the avian target processor 14.

The MS part of the long avian UAT ADS-B message may be encoded with additional details pertaining to the avian target. Within the MS may be two important elements that uniquely identify this long UAT ADS-B message as an avian message. In an exemplary embodiment, the first is the Call Sign of the target, which is typically encoded as the ADS-B participant Call Sign. The Call Sign may be up to 8 alphanumeric characters, including capital letters A-Z, digits 0-9, and "-". This may be the primary location to uniquely identify the target as an avian target and to indicate the size of the avian target(s). The Call Sign encoding of the avian targets may be designated as: BIRD, BIRD-SML, BIRD-MED, BIRD-BIG, FLOCK, DUCK, etc. For UAS targets, the Call Sign field may also be used to uniquely identify a UAS target. The Call Sign encoding of the UAS targets may be designated as: UAS, UAS-SML, UAS-MED, UAS-BIG, SWARM, etc. For these types of aviation applications that detect small targets, the unique Call Sign encoding may be considered an example of a unique small target identifier.

Also within the MS part of the long avian UAT ADS-B message may be additional details pertaining to the avian target, encoded with the Emitter Category field. In an exemplary embodiment, the Emitter Category field is typically used to encode the size and type of the ADS-B participant transmitting the message. Within this Emitter Category field are several fields that may be used. These may include Emitter Category to mean a "Cluster Obstacle", which may be encoded to coincide with a "FLOCK" [of birds] encoded within the Call Sign. These also may include Emitter Category to mean an "Unmanned Aerial Vehicle", which may be encoded to coincide with a "SWARM" [of UAS] encoded within the Call Sign. Additionally, there may be several "Unassigned" fields that are reserved for future use. One of these unassigned fields may be uniquely identified as "Avian" or another one for small UAS (sUAS) that operate under varying flight rules. For these types of aviation applications that detect small targets, the Emitter Category may be considered an example of another type of unique small target identifier. The use of these unique small target identifiers may be used with ADS-B UAT and ADS-B 1090ES messages in the same spirit of the invention. Additionally, these type of small target identifiers may be used with AWOS, ADAS, or ATIX in the same spirit of the invention.

Also within the MS part of the long avian UAT ADS-B message may be specific details pertaining to the length and width of aircraft. In an exemplary embodiment, the smallest Length Code (000) and Width Code (0) may support an aircraft size of Length (L) in the range of 0<L<15 m and Width (W) in the range of 0<W<11.5 m. In an exemplary embodiment, while this field may not be useful for single large avian (or UAS) targets, it may provide some value when a large FLOCK or SWARM is encoded into the Call Sign or the Emitter Category is encoded as a "0" Cluster Obstacle. The Length and Width Codes may only be broadcast from an ADS-B aircraft while it is on the ground, however, it may be adapted to target reports such as avian and UAS type targets that may be reported by an avian detection and reporting system.

In an exemplary embodiment, the last element within the long UAT ADS-B message format may be the AUX-SV field. For example, this field may primarily encode the pressure altitude state vector. This field may be encoded using the airport barometric pressure setting, but it may not provide significant value added for aircraft that decode the SV field.

Once the final long avian UAT ADS-B message is formatted, it may be transmitted to the operational environment. The transmission system may be by wired network or wireless network. In an exemplary embodiment, the transmission may be by a UAT radio transmitter 26 into the RF environment of the NAS. These RF signals may then be received, processed, and displayed by the ATC tower and aircraft users. In an alternative embodiment, a transmission may be via a ground wired network 24 and sent to a ATC tower.

User Presentation

Figure 4:
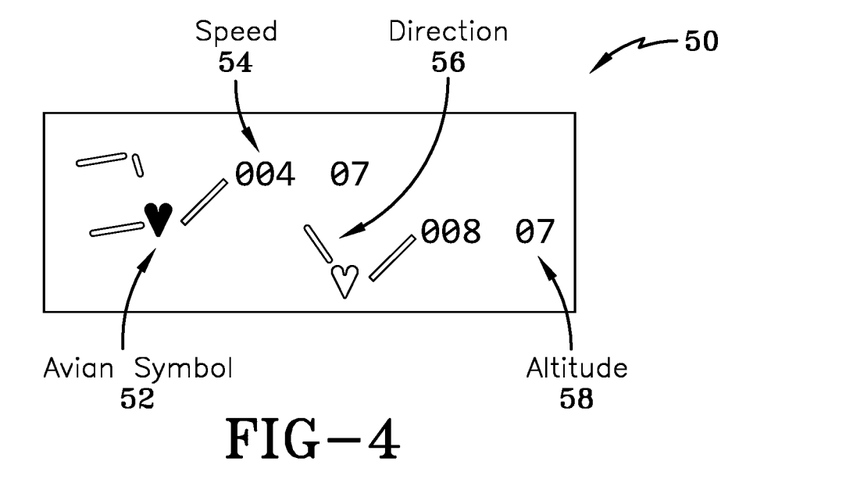
FIG. 4 is an elevation view of an exemplary embodiment of a presentation device/display that uses avian surveillance system symbology.

In an exemplary embodiment, an ATC tower radar operator may be one of the primary users of this type of avian target report information. The FAA has done some preliminary investigation into various avian symbologies to alert an ATC tower radar operator to avian traffic. An example of a presentation device 50 using target display symbology is shown in FIG. 4, which may be suitable for the Standard Terminal Automation Replacement System (STARS). This example illustrates an avian target with a unique avian symbol 52, its speed 54, direction 56, and altitude 58. For example, the color of the target may be used to define its priority or potential hazard. In an exemplary embodiment, the source of the data is from the avian radar system, and may be conveyed using the long avian UAT ADS-B Segment message format.

Figure 5:
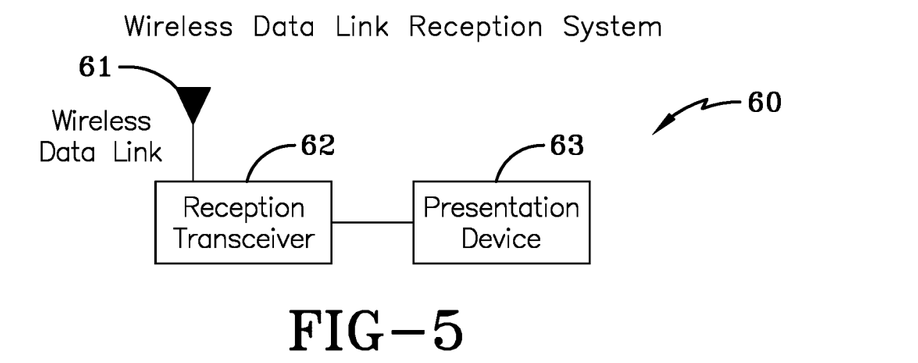
FIG. 5 is a schematic diagram of an exemplary embodiment of a wireless data link reception system.

The user may be presented with graphical, textual, or audio information that represents the reported and distributed target information. In one particular embodiment, a presentation device, in the form of a graphical, textual, or audio device, may be used. The display of the avian target information in the aircraft may be on an advisory basis and be consistent with other TIS-B and FIS-B type information displayed to the pilot. As shown in FIG. 5, an exemplary embodiment in the aircraft may be received via a data link receiver system 60 that may include an antenna 61, a receiver (e.g., reception transceiver) 62, and a presentation device 63 in the form of a display to display an avian or UAS type target with symbology consistent with the end user applications, such as has been documented or another suitable format, which may be linked to the Emitter Category and the Call Sign, which may also be displayed. Such a display may present symbology consistent with the FAA Airworthiness Approval for ADS-B, AC No: 20-172B In Systems and Applications.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. For example, for the various embodiments described above, one of ordinary skill in the art may understand that a similar data encoding approach may be implemented within the ADS-B 1090ES data link using Mode S, or other data link formats to send small target surveillance data via a wired or wireless link. In an exemplary embodiment that may implement a wired link, it may use the ASTERIX CAT21 ADS-B Target Reports type message, along with other ASTERIX CAT messages, with other features of the embodiments described above. Furthermore, in an alternative embodiment, one of ordinary skill in the art may understand that a similar data encoding approach may be implemented with Automated Weather Operation Systems (AWOS), AWOS Data Acquisition Systems (ADAS), or Automated Terminal Information Systems (ATIS), which may include an issuance of a NOTAM (Notice to Airman), with other features of the embodiments described. A feature within such an embodiment may include information being delivered to the operational environment and being presented as a text or voice type message, including pre-recorded, canned synthesized voice messages or generated synthesized voice messages via the presentation device. Additionally, while the exemplary embodiments were described for avian detection to mitigate bird strike risk, the spirit of this invention applies to other surveillance detection systems (e.g., optical, thermal, LIDAR) and data link distribution systems. Many of those variations and modifications will provide the same results and fall within the spirit of the claimed invention. It is the intention, therefore, to limit the invention only as indicated by the scope of the claims.

What is claimed is:

1. A surveillance and target reporting system comprising:
a land-based surveillance detection system adapted to detect small targets that are at least one of avian, UAS, UAV, or drone targets, wherein the surveillance detection system is a radar system;
a data link interface configured to interface the surveillance detection system to a small target processor adapted to process at least one of avian, UAS, UAV, or drone targets;
the small target processor adapted to receive small target data from the surveillance detection system wherein the small target processor is adapted to process small target data selected from the group consisting of avian, UAS, UAV, and drone target data, the small target processor further adapted to utilize data deconfliction and data confliction information to help weigh a threat level of a collision and at least one type of secondary data to enhance reliability for enhanced target reporting that uses at least one small target identifier;
a report formatter adapted to receive report data from the small target processor and format an enhanced target report using a predefined data link format;
a transmission system adapted to receive and distribute the enhanced target report to an operational environment;
a data reception system adapted to receive the enhanced target report using the predefined data link format; and
a presentation device configured to receive the enhanced target report from the data reception system and present the enhanced target report, including unique symbologies for at least one of avian, UAS, UAV, or drone targets;
wherein the data deconfliction is adapted to operate on enhanced target detections, and is adapted to use aircraft ADS-B (IN) data and aircraft profile characteristics to produce enhanced deconflicted non-aircraft target estimates;
wherein the data confliction is adapted to operate on enhanced deconflicted weighted non-aircraft threat targets, and is adapted to use threat weighting and aircraft ADS-B (IN) data to produce enhanced weighted non-aircraft threat targets that are enabled for reporting;
wherein the threat weighting is adapted to use an estimated potential threat of non-aircraft target and database information to produce an enhanced deconflicted weighted non-aircraft threat target estimate; and
wherein the unique symbology includes at least one of aircraft symbol, size, color, speed, direction, altitude, call sign, emitter category, or length and width codes for an avian, UAS, UAV, or drone target.

2. The system of claim 1 wherein the surveillance detection system comprises at least one sensor.

3. The system of claim 1 wherein the small target processor is adapted to utilize a plurality of types of secondary data.

4. The system of claim 1 wherein:
the secondary data is from a database system that includes an area of operation environment to account for threat weighting; and
the database information includes runway, taxiway, or GIS information.

5. The system of claim 1 wherein the data link interface is configured to use an ASTERIX message format.

6. The system of claim 1 wherein:
the predefined data link format is configured to use ADS-B message format comprising at least one unique small target identifier including a unique Call Sign and Emitter Category; and
the ADS-B message includes a length code and a width code pertaining to aircraft.

7. The system of claim 1 wherein the transmission system is configured to use a wired Ethernet interface for distribution to at least one air traffic control tower or operational environment.

8. The system of claim 1 wherein the transmission system is a wireless network configured to use least one wireless communications link.

9. The system of claim 8 wherein the wireless communications link is configured to use at least one unique small target identifier.

10. A method for surveillance and reporting comprising:
providing a land-based surveillance detection system adapted to detect small targets that are at least one of avian, UAS, UAV, or drone targets, wherein the surveillance detection system is a radar system;
providing a data link interface that interfaces the surveillance detection system to a small target processor adapted to process at least one of avian, UAS, UAV, or drone targets such that the small target processor receives small target data from the surveillance detection system;
further providing data deconfliction and data confliction information to help weigh a threat level of a collision and at least one type of secondary data to the small target processor that the small target processor utilizes to enhance reliability for enhanced target reporting that uses at least one small target identifier;
providing a report formatter that receives report data from the small target processor and formats an enhanced target report using a predefined data link format;
providing a transmission system that receives and distributes the enhanced target report to an operational environment;
providing a data reception system that receives the enhanced target report using the predefined data link format; and
providing a presentation device that receives the enhanced target report from the data reception system and presents the enhanced target report, including unique symbologies for at least one of avian, UAS, UAV, or drone targets;
wherein the data deconfliction is adapted to operate on enhanced target detections, and is adapted to use aircraft ADS-B (IN) data and aircraft profile characteristics to produce enhanced deconflicted non-aircraft target estimates;
wherein the data confliction is adapted to operate on enhanced deconflicted weighted non-aircraft threat targets, and is adapted to use threat weighting and aircraft ADS-B (IN) data to produce enhanced weighted non-aircraft threat targets that are enabled for reporting;

wherein the threat weighting is adapted to use an estimated potential threat of non-aircraft target and database information to produce an enhanced deconflicted weighted non-aircraft threat target estimate; and wherein the unique symbology includes at least one of aircraft symbol, size, color, speed, direction, altitude, call sign, emitter category, or length and width codes for an avian, UAS, UAV, or drone target.

11. The method of claim 10 wherein the surveillance detection system comprises at least one sensor.

12. The method of claim 10 wherein the small target processor utilizes a plurality of types of secondary data.

13. The method of claim 10 wherein:

the secondary data is from a database system that includes an area of operation environment to account for threat weighting; and the database information includes runway, taxiway, or GIS information.

14. The method of claim 10 wherein the data link interface uses an ASTERIX message format.

15. The method of claim 10 wherein:

the predefined data link format uses ADS-B message format comprising at least one unique small target identifier including a unique Call Sign and Emitter Category; and the ADS-B message includes a length code and a width code pertaining to aircraft.

16. The method of claim 10 wherein the transmission system uses a wired Ethernet interface for distribution to at least one air traffic control tower or operational environment.

17. The method of claim 10 wherein the transmission system is a wireless network configured to use least one wireless communications link.

18. The method of claim 17 wherein the wireless communications link uses at least one unique small target identifier.

* * * * *